United States Patent [19]

Gozlan et al.

[11] Patent Number: 5,595,488
[45] Date of Patent: Jan. 21, 1997

[54] APPARATUS AND METHOD FOR MONITORING AND IMPROVING THE ALERTNESS OF A SUBJECT

[75] Inventors: Eli Gozlan, Kiryat Motzkin; Shlomo Breznitz, Haifa; Dan Nir, Haifa; Sharon Erlich, Haifa, all of Israel

[73] Assignee: Vigilant Ltd., Israel

[21] Appl. No.: 285,688

[22] Filed: Aug. 4, 1994

[51] Int. Cl.$^6$ ................................. G09B 19/00
[52] U.S. Cl. .................. 434/236; 434/237; 434/258
[58] Field of Search .................... 434/236–238, 434/258

[56] References Cited

U.S. PATENT DOCUMENTS 4,006,539  2/1977  Slomoki .............................. 434/258
5,344,324  9/1994  O'Donnell et al. ................. 434/258

Primary Examiner—Richard J. Apley
Assistant Examiner—Glenn E. Richman
Attorney, Agent, or Firm—Mark M. Friedman

[57] ABSTRACT

Apparatus and method for monitoring and for improving the state of alertness of a subject while he continues to perform a primary task, driving a vehicle, operating machinery, etc. The apparatus includes stimulation apparatus for issuing stimuli to the subject and response apparatus for enabling the subject to reply to the stimuli. The stimuli can be audible, visual or tactile. Test results are processed and compared to baseline values taken when the subject is displaying a normal state of alertness. The rate of activation of the stimulation apparatus increases inversely with a deteriorating state of alertness of the subject to improve the state of alertness of the subject. The apparatus can be fashioned in a wide range of devices including a hand-held portable device, a wristwatch, a behind-the-ear (BTE) clip, a pair of spectacles, and for installation in a steering wheel.

9 Claims, 11 Drawing Sheets

DL TEST

| DL RATING | DL RANGE |
|---|---|
| NORMAL | 25 – 55 |
| SUSPECT | 55 – 65 |
| TIRED | 65 – 90 |
| CRITICAL | OVER 90 |

EXAMPLE OF DL LUT
(FOR AVERAGE
BASELINE DL = 40)

FIG.3A

COGNITIVE TEST

| CT RATING | CT RANGE |
|---|---|
| NORMAL | 0.3 – 0.8 |
| SUSPECT | 0.8 – 1.1 |
| TIRED | 1.1 – 1.5 |
| CRITICAL | OVER 1.5 |

EXAMPLE OF CT LUT
(FOR AVERAGE
BASELINE CT = 0.5)

FIG.3B

OVERALL SCORE LUT

| DL | CT | ERR | SCORE | T(MIN) |
|---|---|---|---|---|
| NORMAL | NORMAL | 0 | NORMAL | 5 |
| NORMAL | NORMAL | 1 | NORMAL | 5 |
| ... | ... | ... | ... | ... |
| SUSPECT | NORMAL | 0 | SUSPECT | 3.5 |
| SUSPECT | NORMAL | 1 | SUSPECT | 3.5 |
| ... | ... | ... | ... | ... |
| TIRED | TIRED | 1 | TIRED | 2 |
| TIRED | TIRED | 2 | TIRED | 2 |
| ... | ... | ... | ... | ... |

FIG.3C

APPARATUS AND METHOD FOR MONITORING AND IMPROVING THE ALERTNESS OF A SUBJECT

FIELD AND BACKGROUND OF THE INVENTION

The present invention relates to the field of psychological data collection in general and in particular to apparatus and method for monitoring and improving the alertness of a subject.

Devices for monitoring the alertness of a subject through administering successive stimuli to the subject and analyzing his responses are known in the art. Typically, the devices are used to provide an indication when a subject displays an insufficient level of alertness to execute his routine work be it driving a vehicle, operating machinery, standing guard, etc. The indication can be provided automatically by the device if the performance level of the subject indicative of his state of alertness falls below a pre-determined baseline performance level or by a mediator administering a test. The insufficient level of subject alertness can be due to drowsiness under monotonous working conditions, mental preoccupation, the influence of alcohol or drugs, etc. Devices are known for use in a variety of environments including when operating a vehicle, within the confines of a laboratory, under field conditions, etc.

Devices are known for administering stimuli at pre-determined time intervals and at random time intervals. Furthermore, devices are known for providing stimuli at variable time intervals in response to the subject's overall performance level provided in terms of either the time taken by the subject to respond to a stimulus and/or the accuracy of the responses given by the subject. Typically, the accuracy of the responses involves the evaluation of correct responses, errors of commission when a response is given at the wrong time and errors of omission when a response is not given at all.

A common feature of the devices is that they require the subject to perform a task. The tasks can be classified into two types: discrimination level tests and cognitive tests. Discrimination level tests are characterized in that the subject has to respond to the presence or the absence of a stimulus in the form of an audible signal, a visual signal, or a tactile signal. Discrimination level tests are referred to as secondary task type tests in the sense that the subject performs the task concurrently with his primary task be it driving a vehicle, operating machinery, standing guard, etc. The devices are typically designed to automatically provide an alarm signal when the overall performance level of a subject, in terms of his response times to stimuli and his accuracy of responses, falls below a pre-determined baseline indicating that the subject is not capable of performing the task in hand.

Advantages of discrimination level tests include that they are generally quick, easy to administer, easy to evaluate, provide concurrent monitoring of subject alertness during execution of a primary task and provide automatic alarm signals when the overall performance level falls below a pre-determined baseline level. Disadvantages of discrimination level tests include that the stimulus can be of such intensity so as to cause a sudden change in the state of alertness of a subject, thereby disguising his true state of alertness, and that the discrimination level detected by the subject depends on the environment in which the test is performed.

In contrast to discrimination level test, cognitive tests are characterized in that the subject has to respond to a stimulus requiring the mental processing of information including recognition, recall, association, etc. before initiating a response. Most of the known cognitive tests are primary task type tests in the sense that the subject only performs that task during an interruption from his routine work. In this case, often a mediator supervises the testing of subject to ascertain which subjects display a sufficient level of alertness to execute their routine work.

Advantages of cognitive tests are that the contents and the difficulty of the tests can be readily adjusted so as to be compatible for a wide range of subjects and that subjects do not become desensitized to the tests. Disadvantages of cognitive tests include that the tests typically take a relatively long time to perform, thereby disrupting the execution of the subject's routine work, and that they are not concurrent with the routine work of the subject.

Exemplary devices known in the art are now briefly described.

U.S. Pat. No. 3,922,665 to Curry et al. discloses a device implementing discrimination level tests in which the intensity of an audio tone increases until the subject actuates a response switch to terminate the stimulus. Successive stimuli are initiated intermittently at selectively variable time intervals inversely related to the time taken by the subject to detect and to respond to each stimulus. An alarm signal is given when no response is made within a given interval after a stimulus is initiated. The device also includes an automatic stimulus level control apparatus for sampling background noise levels and adjusting the volume of the audible tone stimulus to match the background noise level. The device suffers from two main disadvantages. First, that the subject becomes desensitized to the test. Second, that the device records a higher intensity signal than detected by the subject due to the length of time it takes the subject to respond to the signal because during his response time the signal continues to increase.

Devices implementing cognitive tests are disclosed in U.S. Pat. No. 4,464,121 to Perelli, U.S. Pat. No. 4,755,140 to Rimland, and others. In the case of U.S. Pat. No. 4,464,121, the cognitive test requires that the test subject respond to numerals and symbols displayed on a numeric-symbolic display by activating one or more switches while, in the case of U.S. Pat. No. 4,755,140, the cognitive test requires the test subject respond to a particular sequence of numbers using an array of pushbutton keys having programmable variable numerals. The alertness of a subject is provided in terms of response times, the number of errors made in a test, etc. These devices suffer from the above-mentioned disadvantages of devices cognitive tests.

In summary, there is a need for apparatus and method for monitoring and improving subject alertness which combines the beneficial features of discrimination level tests and cognitive tests. In particular, there is a need for apparatus and method for monitoring and improving subject alertness while the subject continues to perform his primary task without undue disturbances.

SUMMARY OF THE INVENTION

The present invention is for apparatus and method for monitoring and improving subject alertness which combines the beneficial features of discrimination level tests and cognitive tests. The apparatus and method can be readily adapted for application in a wide range of different environments including when operating a vehicle, within the confines of a laboratory, under field conditions, etc.

Hence, according to a first aspect of the present invention, there is apparatus for monitoring and improving the alertness of a subject, the apparatus comprising: (a) first stimulation means for providing at least one discrimination level test stimulus to the subject; (b) first response means operable by the subject for responding to the at least one discrimination level test stimulus; (c) second stimulation means for providing at least one cognitive test stimulus to a subject, wherein the intensity of the at least one cognitive test stimulus is associated with the intensity of the at least one discrimination level test stimulus as detected by the subject; (d) second response means operable by the subject for responding to the at least one cognitive test stimulus; and (e) control means for controlling the rate of activation of at least one of the stimulation means such that its rate of activation increases inversely with a deteriorating state of alertness of the subject so as to improve the alertness of the subject.

According to further features of the present invention, each of the stimulation means includes one selected from the following group: a loudspeaker for providing an audible stimulus; a capsule speaker for providing an audible stimulus; a vibrator for providing a tactile stimulus; and a light emitting device for providing a visual stimulus.

According to still further features of the present invention, the first stimulation means includes the second stimulation means.

According to yet still further features of the present invention, the discrimination level test stimulus includes one selected from the following group: a signal of increasing intensity; a pair of signals of substantially the same intensity; a signal having a variable rate of increase in intensity; and a signal having a variable initial intensity.

According to yet still further features of the present invention, the cognitive test stimulus includes one selected from the following group: at least two signals of different frequencies; at least two signals of different intensities; at least three signals where the interval between two consecutive signals is different; and at least two signals of different pulse width.

According to yet still further features of the present invention, each of the stimulation means is fashioned as one selected from the following group: a hand-held portable device; a wristwatch; a behind-the-ear clip; a pair of spectacles; and an attachment on a steering wheel.

According to yet still further features of the present invention, each of the response means includes one selected from the following group: a pad and a microphone.

According to yet still further features of the present invention, the first response means includes the second response means.

According to still yet further features of the present invention, each of the response means is fashioned as one selected from the following group: a hand-held portable device; a wristwatch; and an attachment on a steering wheel.

There is also provided according to a second aspect of the present invention, a method for monitoring and improving the alertness of a subject, the method comprising the steps of: (a) providing at least one discrimination level test stimulus to the subject; (b) providing at least one cognitive test stimulus to a subject, wherein the intensity of the at least one cognitive test stimulus is associated with the intensity of the at least one discrimination level test stimulus as detected by the subject; and (c) controlling the rate of activation of at least one of the stimulation means such that its rate of activation increases inversely with a deteriorating state of alertness of the subject so as to improve the alertness of the subject.

According to further features of the present invention, the step of providing a discrimination level test stimulus is implemented by one selected from the following group: a loudspeaker for providing an audible stimulus; a capsule speaker for providing an audible stimulus; a vibrator for providing a tactile stimulus; and a light emitting device for providing a visual stimulus.

According to still further features of the present invention, the step of providing a discrimination level test stimulus includes providing one selected from the following group: a signal of increasing intensity; a pair of signals of substantially the same intensity; a signal having a variable rate of increase in intensity; and a signal having a variable initial intensity.

According to yet still further features of the present invention, the step of providing a cognitive test stimulus is implemented by one selected from the following group: a loudspeaker for providing an audible stimulus; a capsule speaker for providing an audible stimulus; a vibrator for providing a tactile stimulus; and a light emitting device for providing a visual stimulus.

According to still yet further features of the present invention, the step of providing a cognitive test stimulus includes providing one selected from the following group: at least two signals of different frequencies; at least two signals of different intensities; at least three signals where the interval between two consecutive signals is different; and at least two signals of different pulse width.

BRIEF DESCRIPTION OF THE DRAWINGS

The invention is herein described, by way of example only, with reference to the accompanying drawings, wherein:

FIGS. 3a–3c are tables illustrating typical examples of a Discrimination Level Look-Up-Table (LUT), a Cognitive Test Look-Up-Table (LUT) and an Overall Score Look-Up-Table (LUT) employed by the apparatus of the present invention;

DESCRIPTION OF THE PREFERRED EMBODIMENTS

The present invention is of apparatus and method for monitoring and improving the alertness of a subject.

The principles and operation of the apparatus and the method of the present invention may be better understood with reference to the drawings and the accompanying description.

Figure 1:
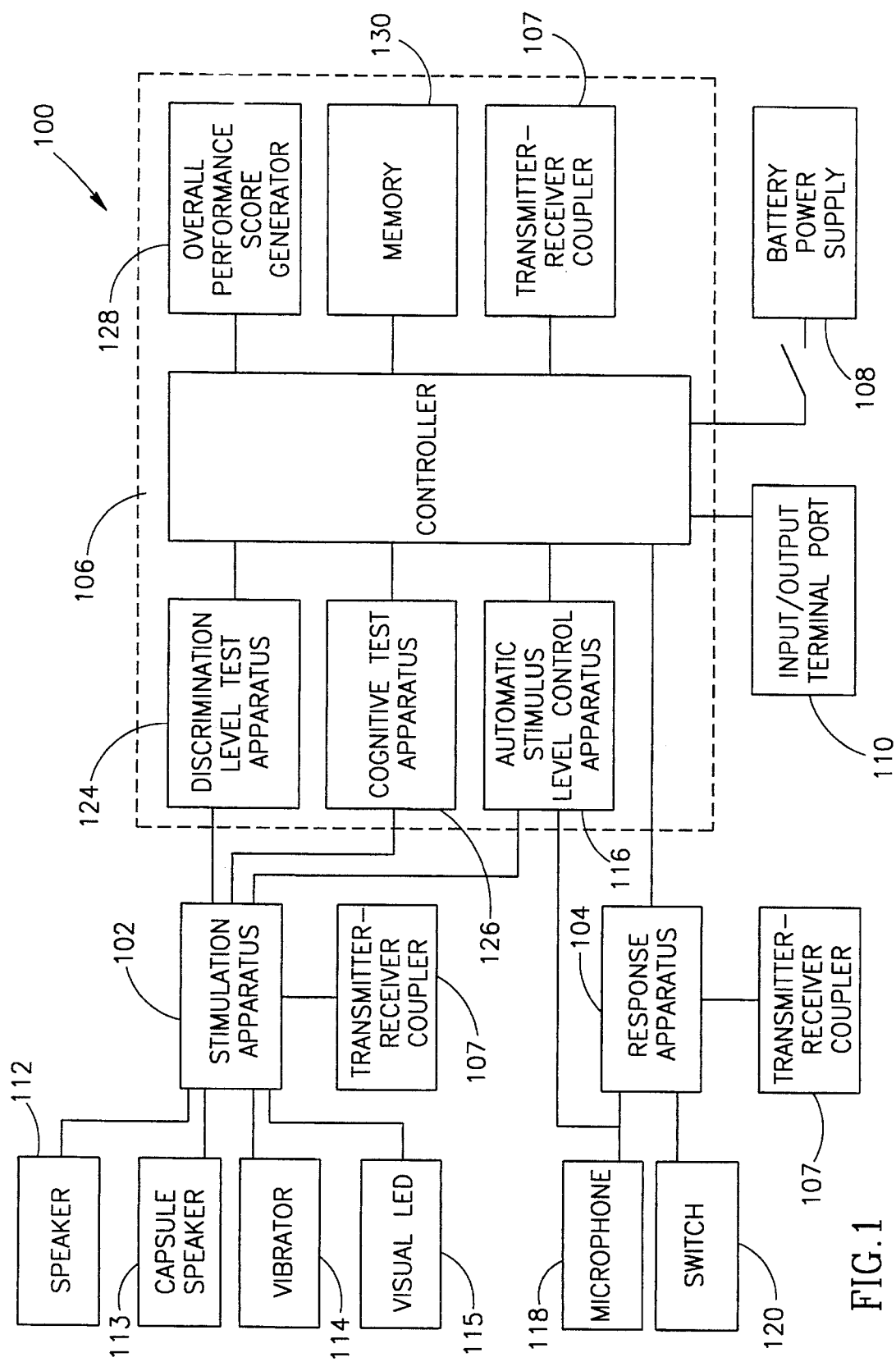
FIG. 1 shows a block diagram of apparatus for monitoring and improving the alertness of a subject constructed and operative according to the teachings of the present invention.
Figure 2:
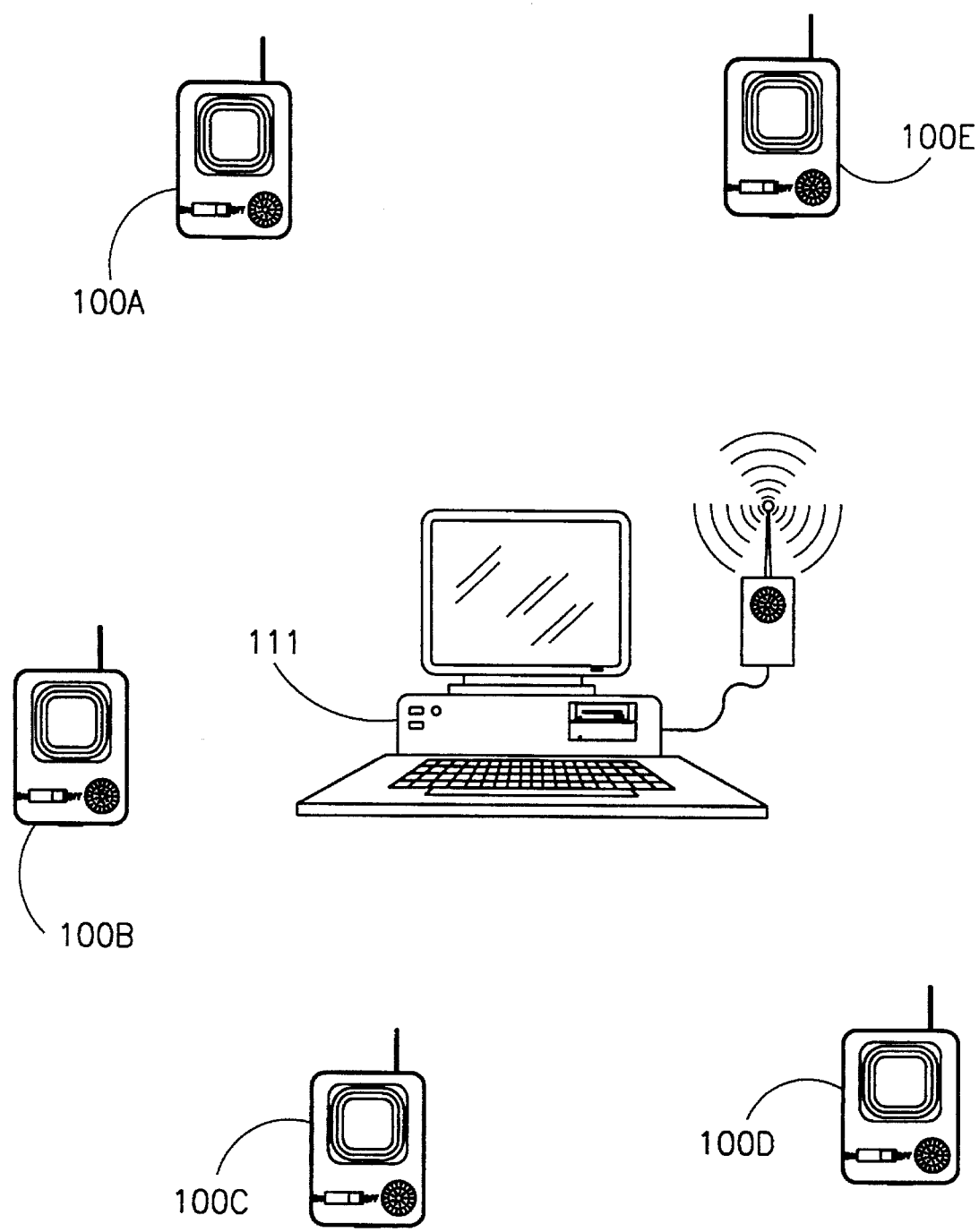
FIG. 2 shows a diagram of a host station and a plurality of hand-held devices.

With reference now to the drawings, FIG. 1 shows a block diagram of the apparatus for monitoring and improving the alertness of a subject, generally designated 100, constructed and operative according to the teachings of the present invention. Broadly speaking, apparatus 100 is configured as a small, battery powered device including stimulation apparatus 102 for issuing stimuli as part of an alertness test, response apparatus 104 for enabling the subject to respond to the stimuli and control apparatus 106 for controlling the operation of device 100. Device 100 includes an On/Off switch 108 and an input/output terminal port 110 for interfacing device 100 with a host station. Alternatively, host station 111 can interface with a number of devices 100a–100e be through radio communication as shown in FIG. 2.

Stimulation apparatus 102 can be combined with response apparatus 104 in a single housing or each apparatus can be housed separately. In the case that stimulation apparatus 102 and response apparatus 104 are housed separately, control apparatus 106 can be combined with either stimulation apparatus 102 or response apparatus 104 depending on the particular configuration. Communication between control apparatus 106 and either stimulation apparatus 102 or response apparatus 104 when not in the same housing as control apparatus 106 is maintained through a short-range, ultrasonic or radio frequency, transmitter-receiver coupling 107 as known in the art. The location of transmitter 107a and receiver 107b of transmitter-receiver coupling 107 depends on whether control apparatus 106 is housed with stimulation apparatus 102 or response apparatus 104. In the instance that control apparatus 106 is housed with stimulation apparatus 102, then the housing including response apparatus 104 includes transmitter 107a. Alternatively, in the instance that control apparatus 106 is housed with response apparatus 104, then the housing with stimulation apparatus 102 includes transmitter 107a.

Stimulation apparatus 102 can be implemented in one of four devices. First, as a loudspeaker 112 for issuing audible signals. Second, as a capsule speaker 113 for applying stimuli to the bone behind the ear of a subject such that the stimuli also act as low intensity audible signals. Third, as a mechanical vibrator 114 for issuing tactile signals against, for example, the wrist of a subject. And finally, as a light emitting device 115 for issuing visible signals. An advantage of implementing stimulation apparatus 102 as either capsule speaker 113 or as mechanical vibrator 114 is that signals are only discernible to the subject. It should be noted that in the event that stimulation apparatus 102 is implemented as loudspeaker 112, then control apparatus 106 preferably includes automatic stimulus level control apparatus 116, including a microphone 118 for sampling background noise levels, for adjusting the intensity of issued signals with respect to background noise levels. This feature is of particular importance for noisy environments, for example, when driving a vehicle.

Response apparatus 104 can be implemented as a microphone 118 enabling apparatus 100 to be responsive to vocal responses, thereby freeing both hands of a subject, or as a depressible pad-like switch 120. Pad-like switch 120 is typically provided in a portable case which can be placed in the pocket of the subject such that the subject can easily depress switch 120 with his hand. The degree of pressure required to activate switch 120 is adjusted such that, on the one hand, the subject can easily depress switch 120 without any great effort while, on the other hand, ensuring that an inadvertent slight pressure on switch 120 will not depress switch 120.

It is a particular feature of the present invention that apparatus 100 administers a combined alertness test including a discrimination level test and a cognitive test. As described hereinabove, a discrimination level test is characterized in that the subject has to respond to the earliest discernible level of stimulus while a cognitive test is characterized in that the subject has to process information requiring the cognitive processes of recognition, recall, association, etc. before providing a response to a stimulus. Hence, control apparatus 106 includes discrimination level test apparatus 124 and cognitive test apparatus 126.

In the preferred embodiments of apparatus 100, stimulation apparatus 102 provides stimuli of both the discrimination level and cognitive tests while, in the same manner, response apparatus 104 is used for enabling the subject to respond to stimuli of both types of test. Hence, the stimuli of discrimination level tests administered to a subject can be in the form of audible signals provided by loudspeaker 112 and capsule speaker 113, tactile signals provided by vibrator 114 and visual signals provided by light emitting device 115. In the same manner, the stimuli of cognitive tests administered to a subject can be in the form of audible signals, tactile signals and visual signals.

Control apparatus 106 further includes an overall performance score generator 128 and a memory 130. Overall performance score generator 128 is used for preparing Look-Up-Tables (LUTs) stored in memory 130 and for generating the overall performance scores of a subject depending on the responses of the subject to the alertness tests. The LUTs includes a Discrimination Level (DL) Test LUT and a CT Test LUT in which the responses of a subject are rated in comparison to baseline information taken when the subject displays his normal state of alertness. The LUTs also include an Overall Score LUT for determining the overall state of alertness of the subject in terms of his responses to the alertness test and the time of the next alertness test.

With reference now to FIGS. 3a–3c, the tables illustrate typical DL test, Cognitive Test and Overall Score LUTs, respectively. In particular, FIGS. 3a and 3b illustrate that the typical DL and Cognitive Test LUTS have four ratings of a response of a subject: Normal, Suspected, Tired and Critical. The implications of these ratings are as follows:

Normal: a subject's prevailing state of alertness is substantially comparable to his normal state of alertness Suspect: a subject's prevailing state of alertness is below his normal state of alertness and that his state of alertness needs improvement Tired: a subject's prevailing state of alertness is well below his normal state of alertness and that his state of alertness needs considerable improvement Critical: a subject's prevailing state of alertness is dangerously below his normal state of alertness—and that he could even be asleep—and that his state of alertness needs massive and drastic improvement Hence, for the sake of exposition only for the DL LUT, for an average baseline response of 40 units, the Normal rating is from 25 to 55 units, the Suspect rating is from 55 to 65 units, the Tired rating is from 65 to 90 units and the Critical rating is over 90 units. In a similar manner for the CT LUT, for an average baseline response of 0.5, the Normal rating is from 0.3 to 0.8 sec, the Suspect rating is from 0.8 to 1.1 sec, the Tired rating is from 1.1 to 1.5 sec and the Critical rating is over 1.5 sec.

Turning now to FIG. 3c, it can be appreciated that the Overall Score LUT reflects a combined qualitative and quantitative evaluation of a subject's responses to an alertness test. As can be seen, the Overall Score LUT receives three inputs designated DL, CT and ERR. The inputs DL and CT are the ratings of the responses of a subject in a discrimination level test and a cognitive test, respectively. While the input ERR is the number of errors in an alertness test in which errors include both errors of commission when a response is given at the wrong time and errors of omission when a response is not given at all. These inputs are used to determine a "Score" of the prevailing state of alertness of a subject and the interval of time before the next test. Typically, overall performance score generator 128 also provides a rating of the prevailing state of alertness of a subject according to one of the ratings: Normal, Suspect, Tired and Critical. It can be readily appreciated that the aggregate of three inputs in determining the prevailing state of alertness provides a far more accurate determination instead of just one or even two inputs. For example, if a subject achieved a rating of tired in a DL test, a rating of normal in a CT test and no errors, then his overall score would be Suspect.

Analysis of the ratings in the Score output indicates that the scores are used as a feedback mechanism whereby the rate of activation of stimulation apparatus 102 increases inversely with a deteriorating state of alertness of the subject. For example, the time between tests for a subject who achieved an overall score rating of "normal" is 5 minutes while the time between tests for a subject who received an overall score rating of "tired" is 2 minutes. The increasing of the rate of alertness tests is designed to provide an indication to the subject that his state of alertness is deteriorating and to at least maintain or in most probability improve the state of alertness of the subject.

With reference now to FIGS. 4a–4e, there are shown graphic representations of typical discrimination level tests and cognitive tests.

Figure 4A:
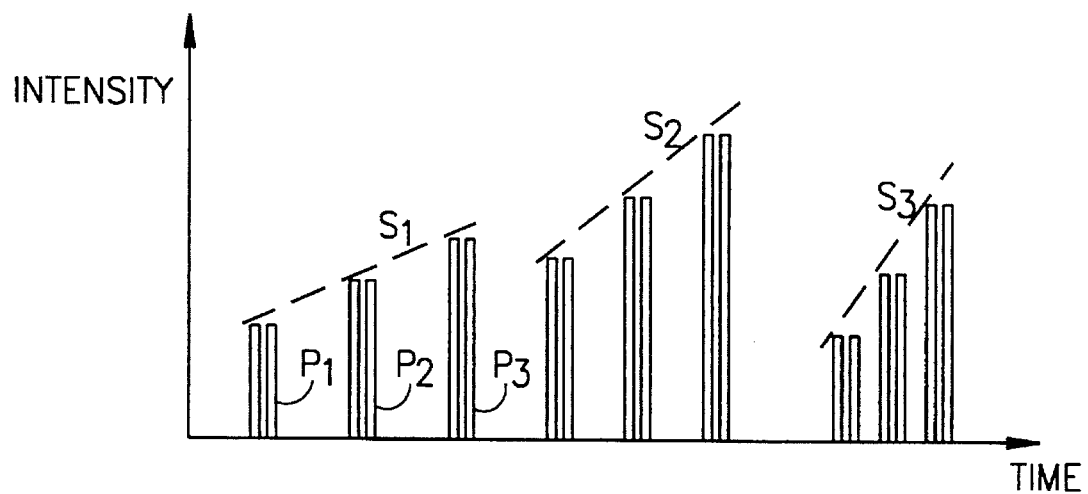
FIGS. 4a–4e show graphic representations of typical discrimination level test signals and cognitive test signals according to the teachings of the present invention.

In principle, the purpose of a discrimination test is to measure the level of a stimulus as first discerned by a subject according to his prevailing state of alertness. This is achieved by discrimination level test apparatus 124 issuing series of stimuli $S_1$, $S_2$ and $S_3$ as shown in FIG. 4a. Each series of stimuli are in the form of pairs of signals $P_1$, $P_2$ and $P_3$ in which consecutive pairs of signals have increasing intensities. It should be noted that within each pair of signals, the signals have substantially the same intensity such that the subject can easily recognize a particular level of intensity. It should also be noted that there is a delay between consecutive pairs such that the subject has sufficient time to respond, for example by depressing switch 120, to the level of intensity that he first discerned.

A further feature of discrimination level test apparatus 124 is that the initial level of a stimulus is coordinated with the background noise level as detected by automatic stimulus level control apparatus 116. For example, the initial intensity of the first pair of signals of series of stimuli denoted $S_2$ is greater than the initial intensity of the first pair of signals of the series of stimuli denoted stimulus $S_1$. A still further feature of discrimination level test apparatus 124 is that the rate of increase of the level of intensity of stimuli is preferably coordinated with the prevailing state of alertness of the subject as reflected by his overall performance scores. Preferably, the rate of increase increases inversely with a deteriorating state of alertness of the subject such that the expected interval of time for the subject to detect a particular intensity remains substantially the same from the onset of an alertness test. For example, the rate of increase in intensity of the signals of the series of stimuli denoted $S_3$ is greater than the rates of increase in intensity of the signals of the series of stimuli denoted $S_1$ and $S_2$.

The intensity of the discrimination level test stimulus first discerned by the subject is used by cognitive test apparatus 126 for administering one or more of several types of cognitive tests at the same or substantially the same level of intensity. Typically, the type of application determines the type of cognitive test. Alternatively, the cognitive tests can be determined randomly. In this case, cognitive test stimuli are preferably given as single signals.

Figure 4B:
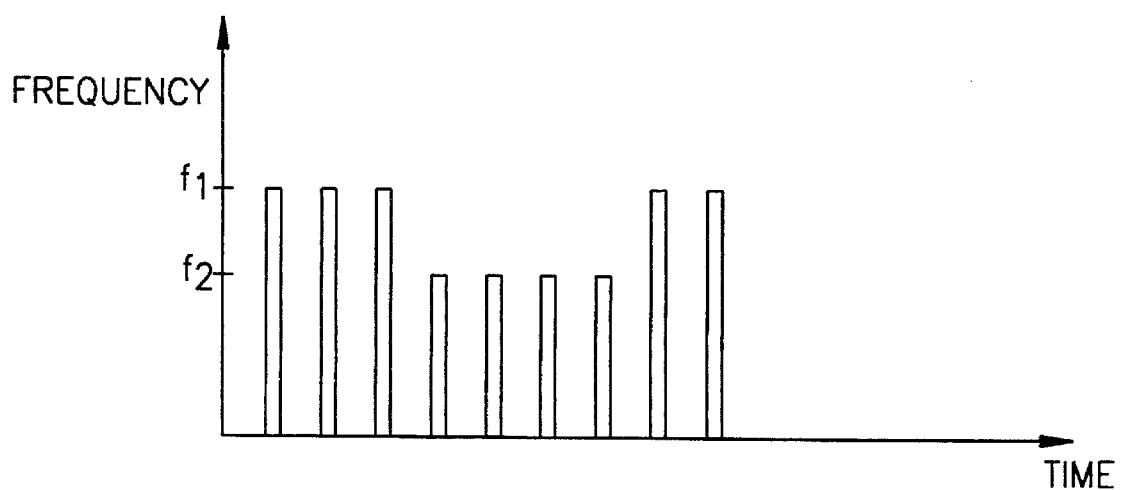

The objective of the first type of cognitive test is that the subject detects the change of frequency between two consecutive signals. Hence, the first type of cognitive test includes administering series of signals of which two or more of the stimuli are at different frequencies as shown in FIG. 4b. Typically, the frequencies of the stimuli are between about 500 Hz and about 4000 Hz while the frequency difference is about 15% of the frequency. Preferably, the changes in the frequency of the signals are after the third signal such that the subject has the opportunity to "learn" the background frequency.

Figure 4C:
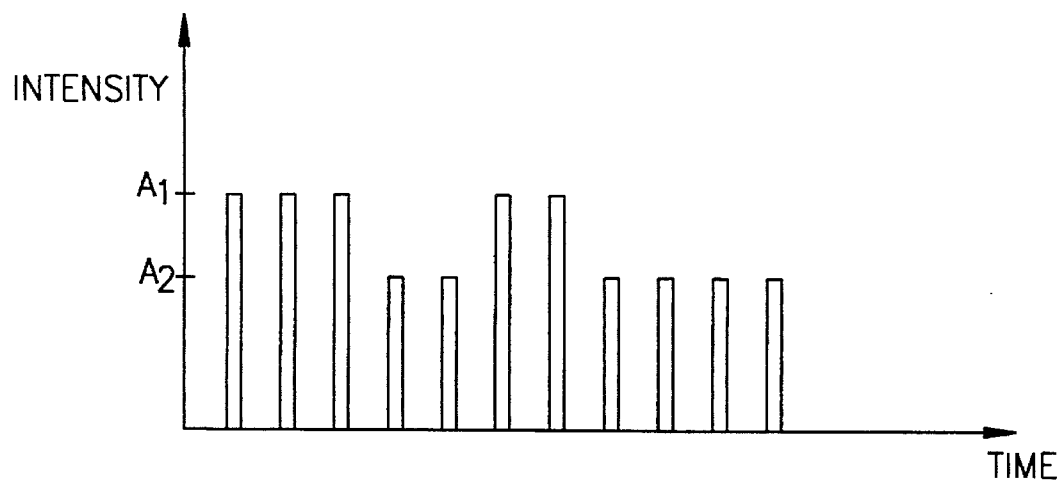

The objective of the second type of cognitive test is that the subject detects the change of intensity between two consecutive signals. Hence, the second type of cognitive test includes administering a series of stimuli of which two or more of signals are at different intensities as shown in FIG. 4c. Preferably, the changes in the intensity of the signals are after the third signal such that the subject has the opportunity to "learn" the background intensity.

Figure 4D:
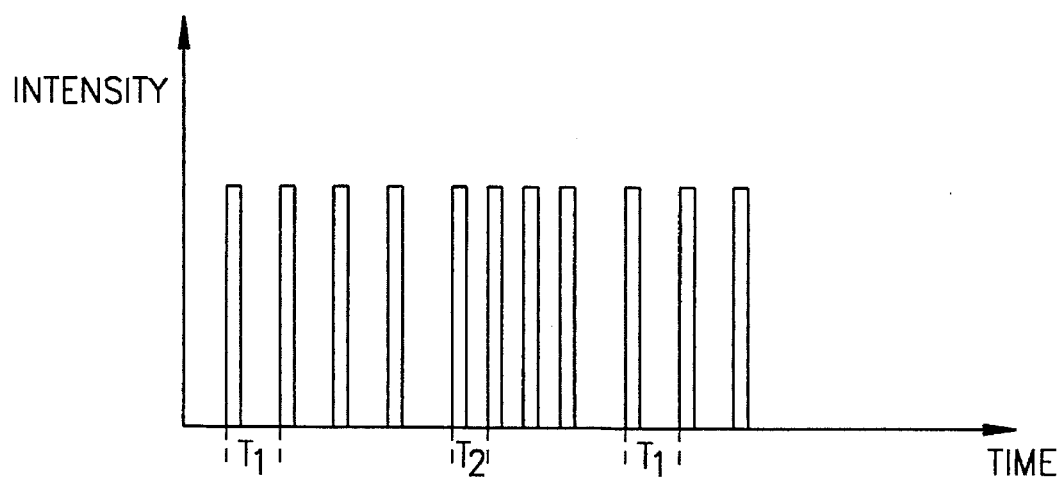

The objective of the third type of cognitive test is that the subject detects the change of time interval between two consecutive signals. Hence, the third type of cognitive test includes administering a series of signals of which there are different time intervals between two consecutive signals as shown in FIG. 4d. As shown, time interval $t_1$ is greater than time interval $t_2$. Typically, the time interval between two consecutive signals is approximately 1 sec while the change in the time interval is about 20% of the time interval.

Figure 4E:
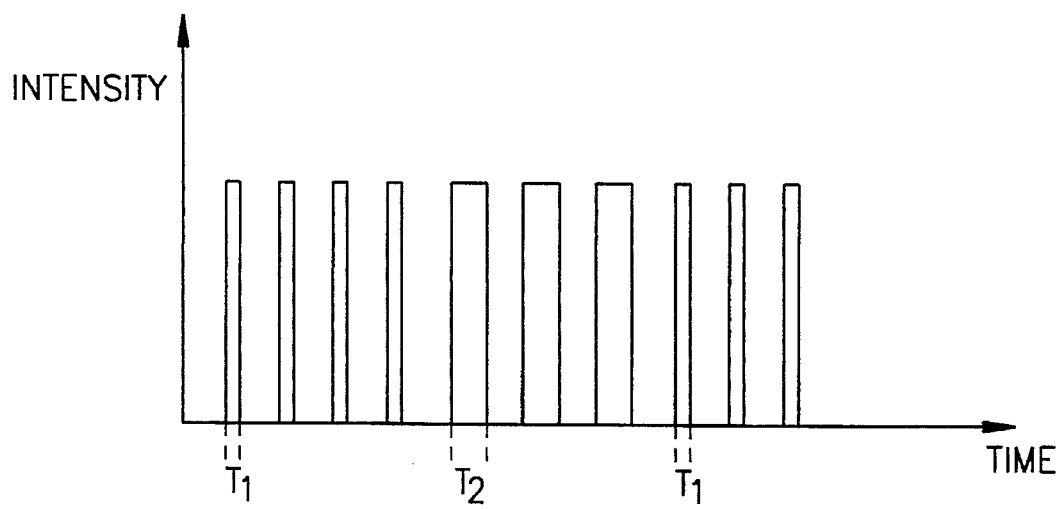

And finally, the objective of the fourth type of cognitive test is that the subject detects the change of pulse width between two consecutive signals. Hence, the fourth type of cognitive test includes administering series of signals of which there are different pulse widths as shown in FIG. 4e. As shown, pulse width $T_1$ is shorter than pulse width $T_2$. Typically, the pulse width of a signal is approximately 0.3 sec while the change in the pulse width is about 20%.

It can be readily appreciated that the combination of administering a discrimination level test followed by one or more of the cognitive tests renders the following advantages. First, that the combination of test types and their difficulty levels can be readily tailored so as to be compatible for a wide range of applications. Second, that the subjects will not be able to become desensitized to the test. Third, that the alertness tests typically take between about 4 seconds and about 20 seconds such that they do not disrupt the execution of the subject's routine work. And finally, that the alertness tests can be administered concurrently with the routine work of the subject.

With reference now to FIGS. 5–10, there are shown several embodiments of apparatus 100 for monitoring the alertness of a subject constructed and operative according to the teachings of the present invention in which similar elements are likewise numbered. The different embodiments enable the realization of the apparatus for a wide range of applications taking into account their particular requirements. For example, one such requirement is that the stimuli administered to the subject as part of an alertness test have to be discrete enough such that they are only discernible to the subject, for example, during guard duty. Another consideration is whether the subject requires one or both hands to execute his routine work, for example, when driving a vehicle, operating machinery, etc.

Figure 5:
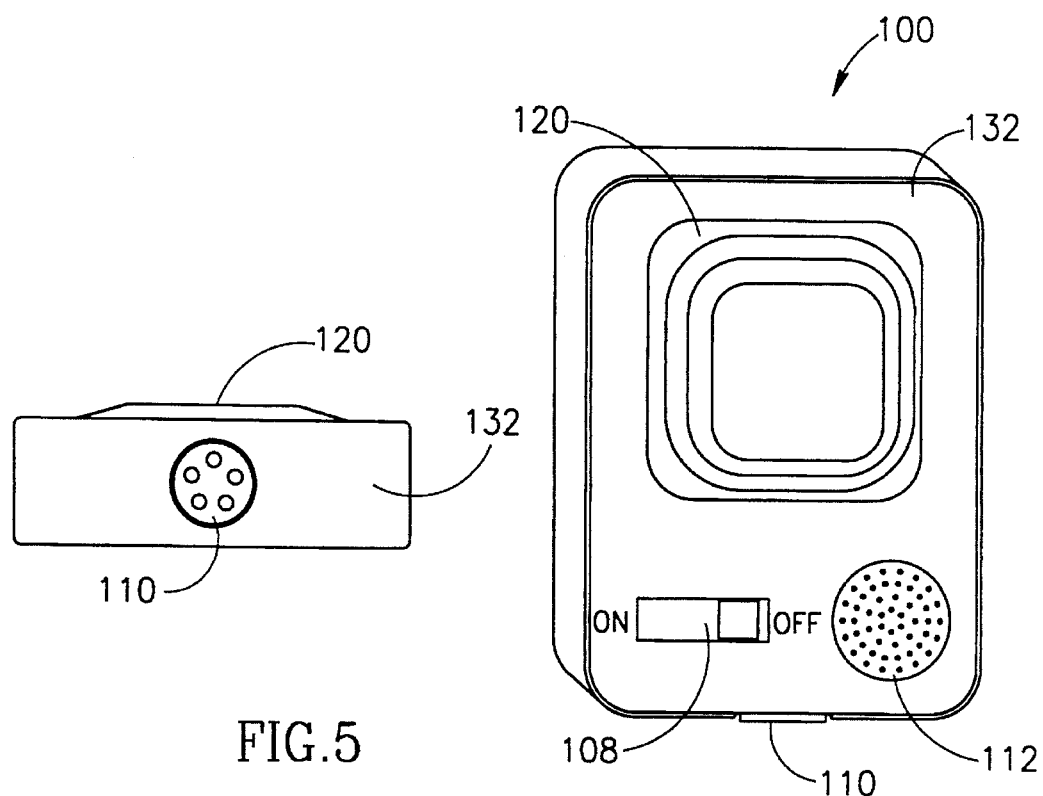
FIG. 5 shows a schematic illustration of a basic embodiment of the apparatus for monitoring and improving the alertness of a subject fashioned as a hand-held device.

With particular reference to FIG. 5, there is shown a basic configuration of apparatus 100 in which stimulation apparatus 102 and response apparatus 104 are combined into a single hand portable housing 132. Stimulation apparatus 102 is preferably implemented as loudspeaker 112 for administering audible signals while response apparatus 104 is preferably implemented as a pad-like switch 120.

Figure 6:
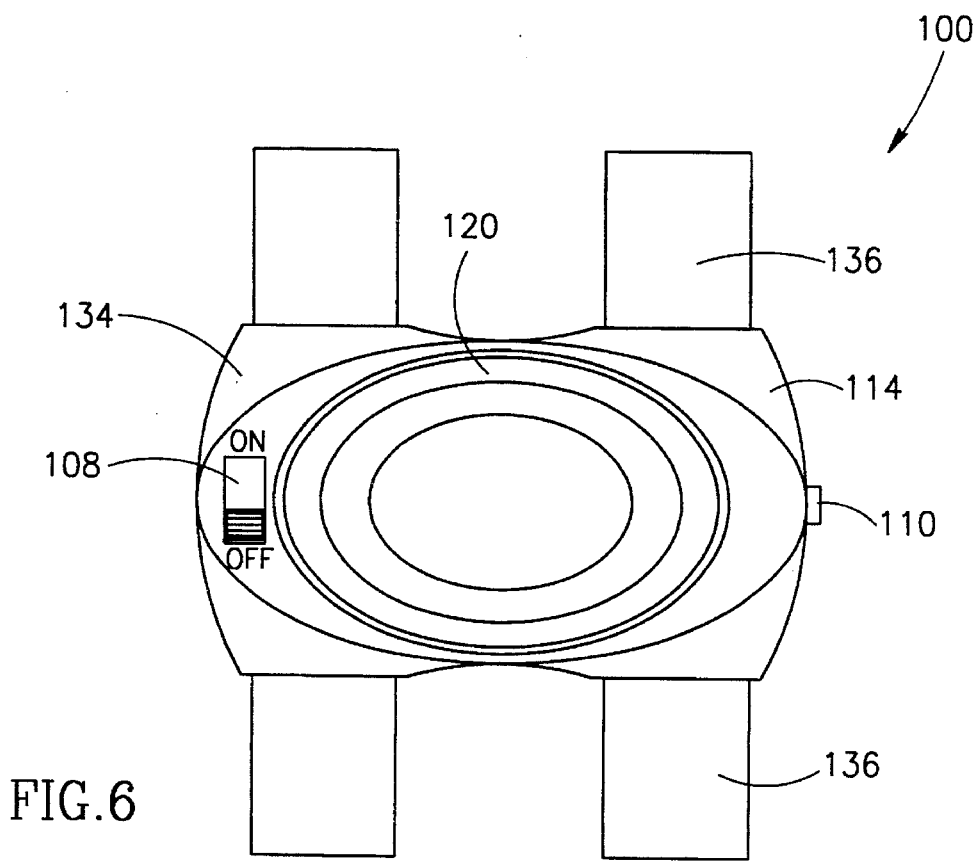
FIG. 6 shows a schematic illustration of a second embodiment of the apparatus for monitoring and improving the alertness of a subject fashioned as a wristwatch.

Turning now to FIG. 6, there is shown a second embodiment of apparatus 100 in which again stimulation apparatus 102 and response apparatus 104 are combined into a single housing fashioned into a wristwatch 134 attached to a strap 136 for wearing on the wrist of a subject. In this case, stimulation apparatus 102 is preferably implemented as mechanical vibrator 114 for administering tactile stimuli while response apparatus 104 is preferably implemented as pad-like switch 120.

Figure 7:
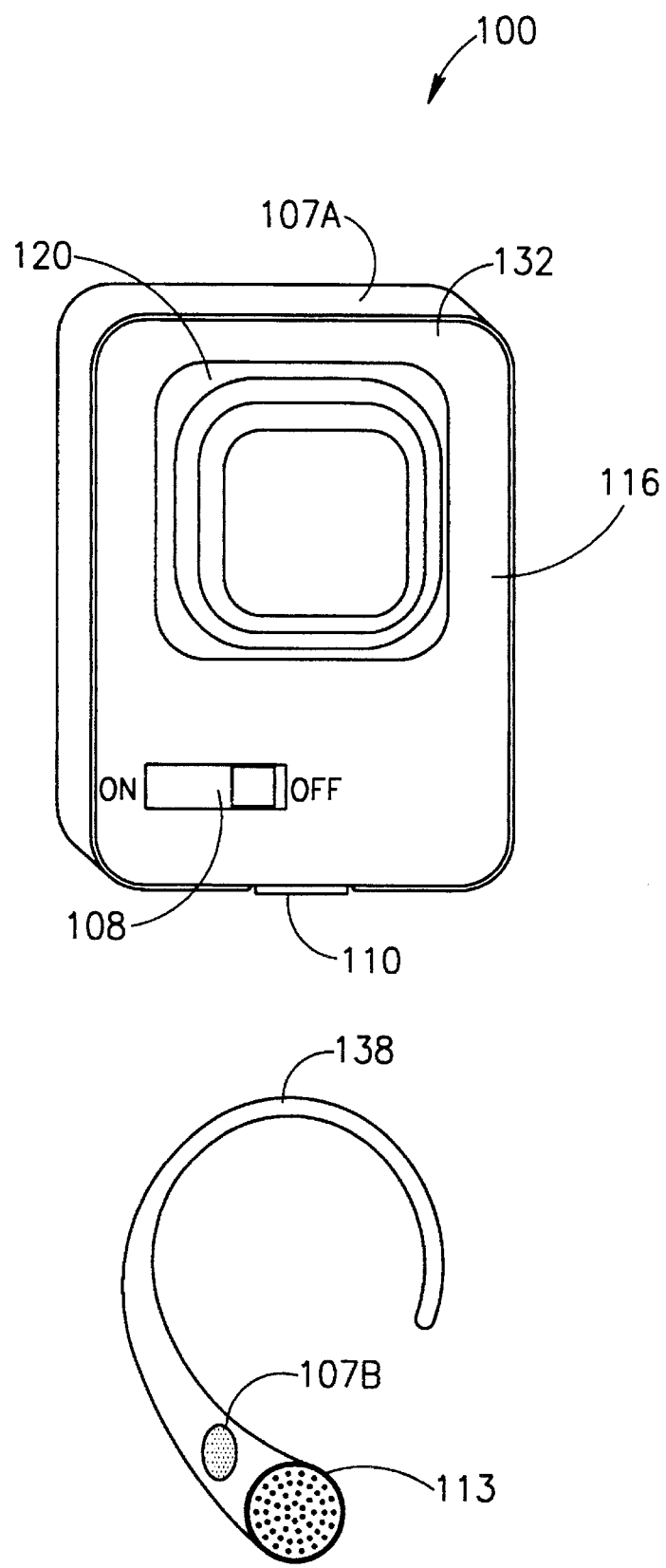
FIG. 7 shows a schematic illustration of a third embodiment of the apparatus for monitoring and improving the alertness of a subject where the stimulation apparatus is fashioned as a behind-the-ear clip.

In FIG. 7, there is shown a third embodiment of apparatus 100 in which stimulation apparatus 102 is fashioned as a behind-the-ear (BTE) clip 138 while response apparatus 104 is in the form of housing 132. In this case, stimulation apparatus 102 is preferably implemented as speaker capsule 113 for administering audible signals while response apparatus 104 is preferably implemented as pad-like switch 120. Housing 132, which includes control apparatus 106 and response apparatus 104, includes transmitter 107a while BTE clip 138 includes receiver 107b such that communication is maintained between control apparatus 106 and stimulation apparatus 102.

Figure 8:
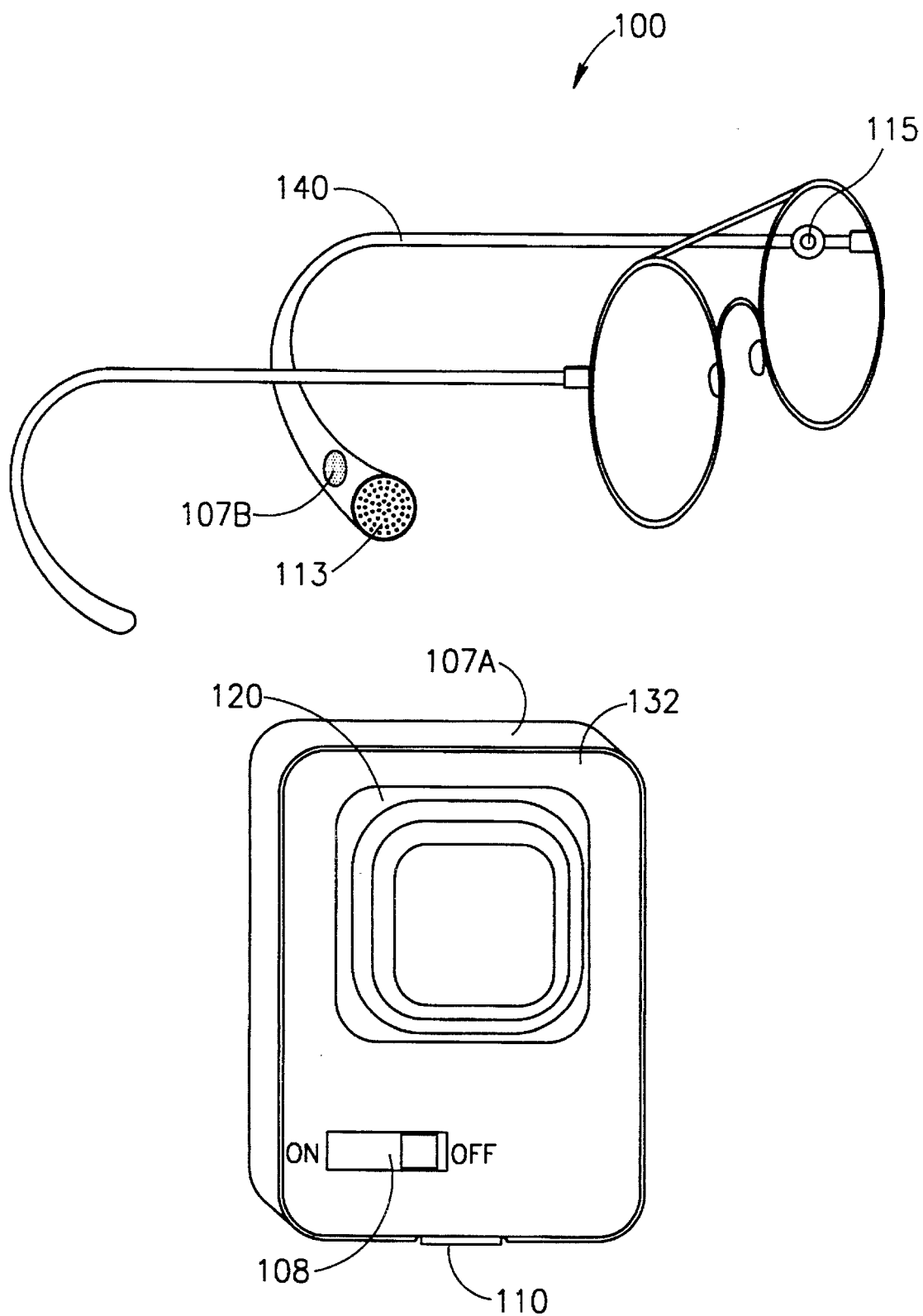
FIG. 8 shows a schematic illustration of a fourth embodiment of the apparatus for monitoring and improving the alertness of a subject where the stimulation apparatus is fashioned as a pair of spectacles.

Apparatus 100 shown in FIG. 8 is similar to apparatus 100 shown in FIG. 5 except that stimulation apparatus 102 is fashioned as a pair of spectacles 140. In this case, stimulation apparatus 102 includes both a capsule speaker 113 for providing audible signals and a LED device 115 for providing visual stimuli 122 towards, in this case, the left eye of a subject. This arrangement enables that either one of capsule speaker 113 and LED device 115 provide the discrimination level type test while the other provides the cognitive type test or that either one of capsule speaker 113 and LED device 115 provide both tests. Housing 132, which includes control apparatus 106, response apparatus 104 and automatic stimulus level control apparatius 116, includes transmitter 107a while spectacles 140 includes receiver 107b such that communication is maintained between control apparatus 106 and stimulation apparatus 102.

Figure 9:
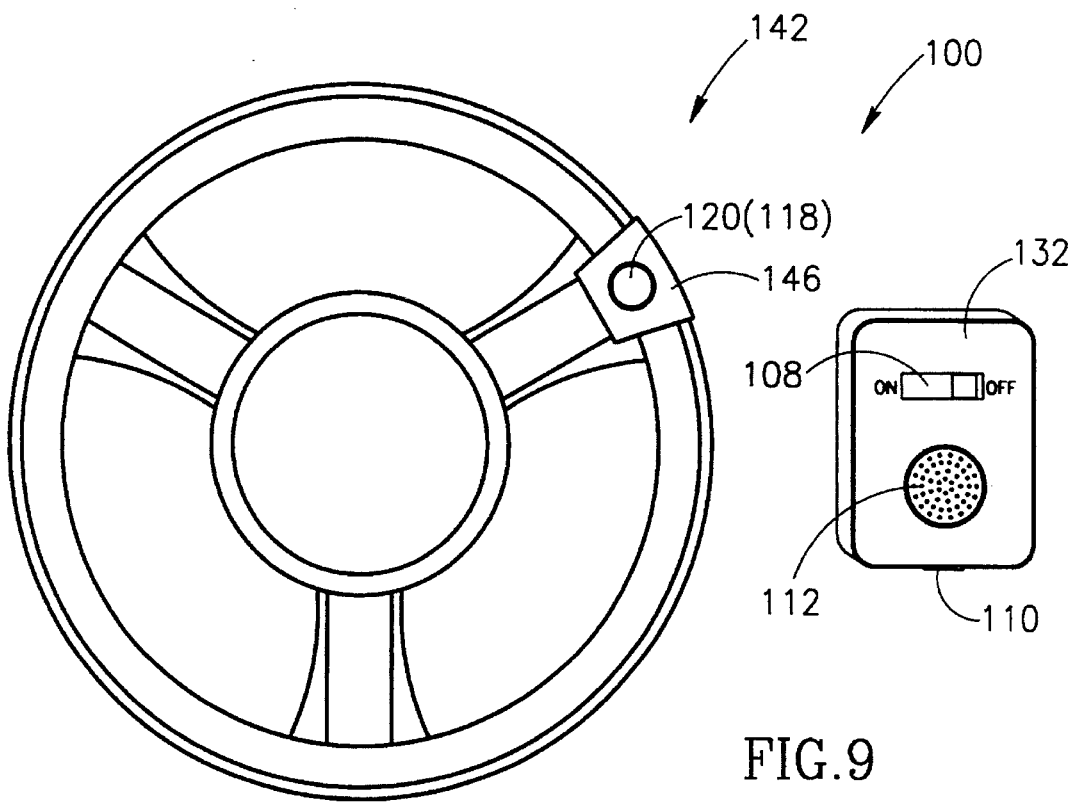
FIG. 9 shows a schematic illustration of a fifth embodiment of the apparatus for monitoring and improving the alertness of a subject fashioned as an off-the-shelf apparatus for use in a vehicle.
Figure 10:
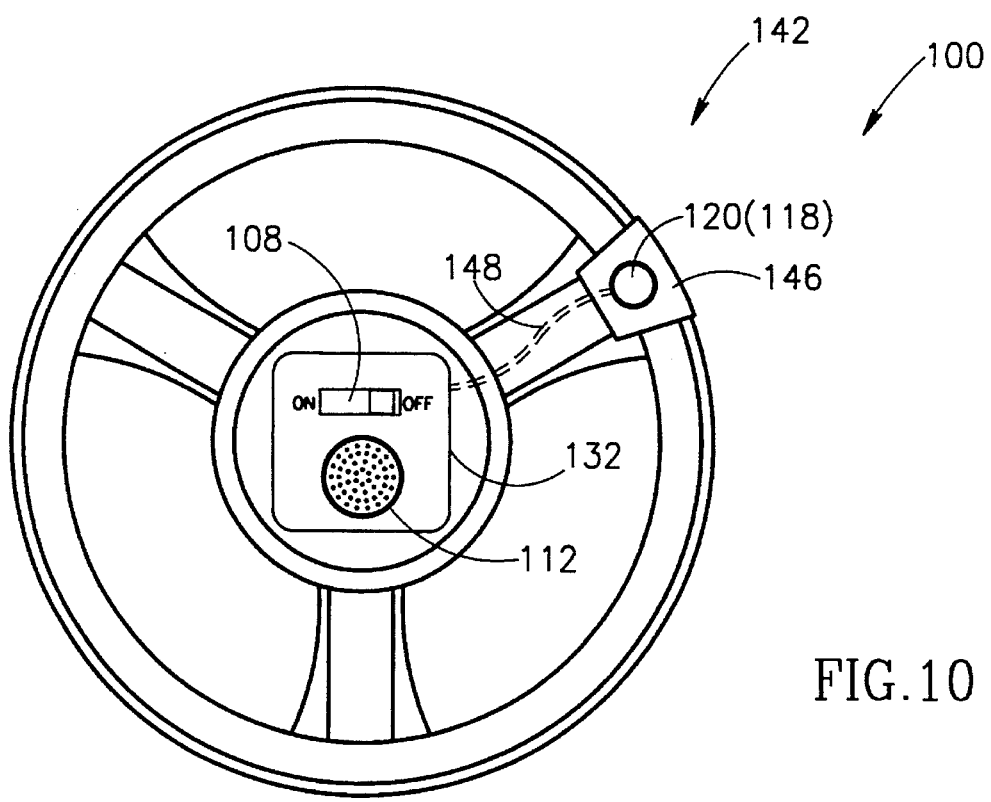
FIG. 10 shows a schematic illustration of a sixth embodiment of the apparatus for monitoring and improving the alertness of a subject fashioned for installation in the steering wheel of a vehicle.

With reference now to FIGS. 9 and 10, two embodiments of apparatus 100, generally designated 142 and 144, respectively, are shown adapted for monitoring the alertness of subjects driving a vehicle. Apparatus 142 includes housing 132 and a clip 146. Housing 132 preferably includes stimulation apparatus 102 in the form of a loudspeaker 112, control apparatus 106 and receiver 107b. Clip 146 includes response apparatus 104, either in the form of microphone 118 or switch 120, and transmitter 107a. In the instance that response apparatus 104 is a microphone, then clip 146 can be adapted to be clipped onto any part of the steering wheel including the rim or the radially extending supports. However, when response apparatus 104 is in the form of a switch, then clip 146 is preferably adapted to be clipped onto the rim of the steering wheel such that the driver can concurrently grip the steering wheel and respond to signals by depressing switch 120 on the rim of the steering wheel without having to remove his hands therefrom. In a similar manner to apparatus 142, apparatus 144 includes housing 132 and clip 146 except that housing 132 is adapted to be installed in the steering wheel column. In this case, wires 148 passing through one of the radially extending supports can connect clip 146 to housing 132.

The operation of system 100 is now described with reference to FIGS. 11 and 12. Before apparatus 100 can be used for monitoring the alertness of a user, it must be first initialized in a learn mode in which overall score generator apparatus 128 learns the baseline responses of the subject in a natural state of alertness to the discrimination test and to the cognitive tests. From these baseline responses, overall score generator apparatus 128 creates the LUTs for future calculations of scores reflecting the state of alertness of the subject.

Figure 11:
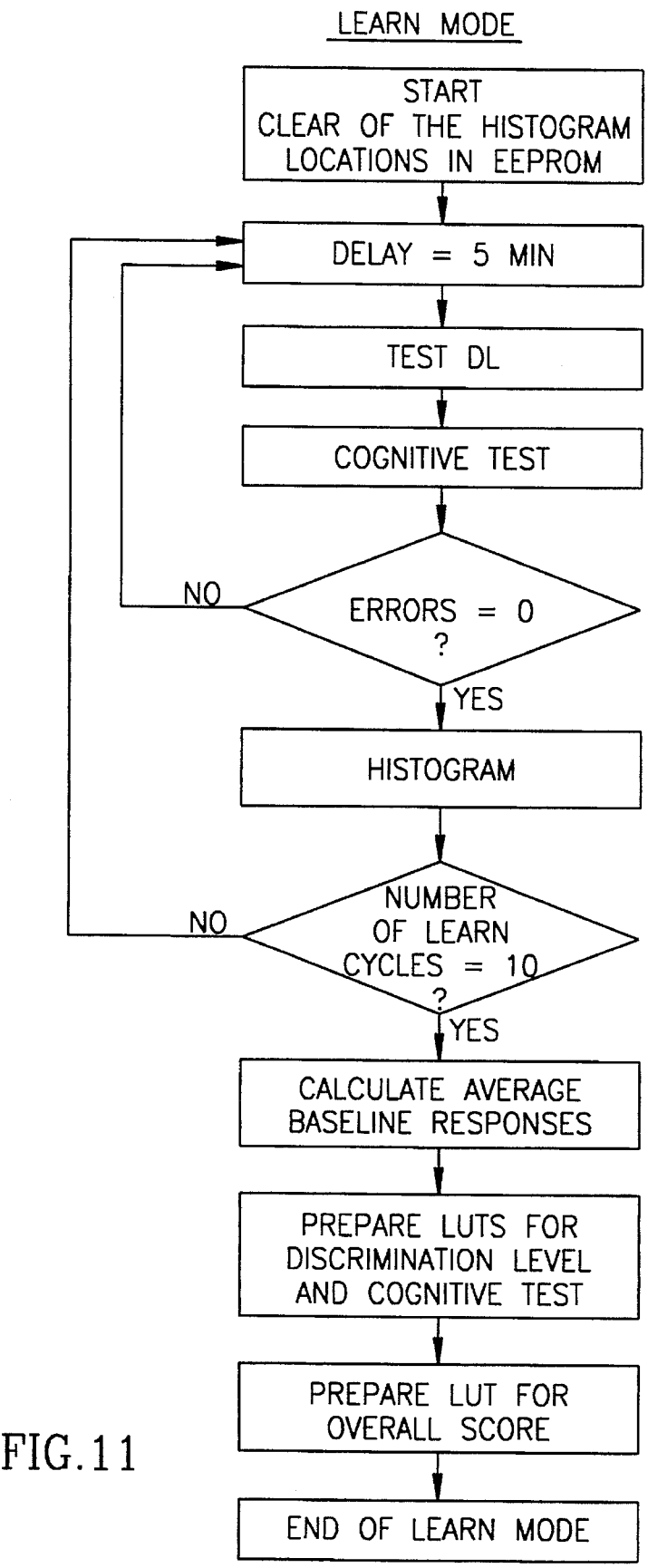
FIGS. 11 and 12 show flow charts illustrating the operation of the apparatus for monitoring and improving the alertness of a subject.
Figure 12:
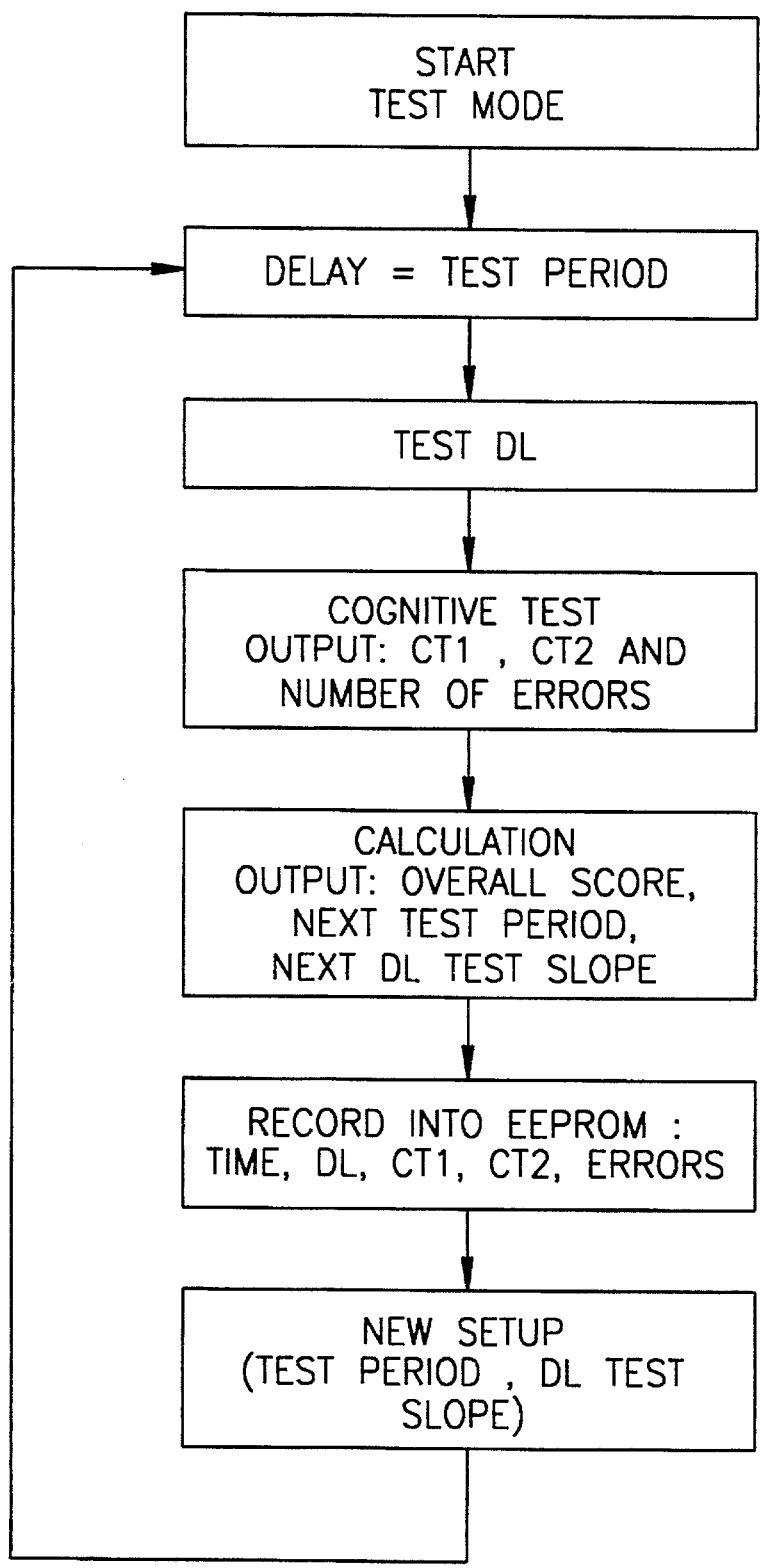

Turning now to FIG. 11, the flow chart of the Learn Mode shows that, for example, ten cycles of a discrimination test followed by a cognitive test are administered to the subject for determining his baseline responses. The cognitive tests include one or more of the four types of cognitive tests as described above, however, for the sake of the example described hereinbelow, it is assumed that only the first type of cognitive test is administered, namely, in which signals of two different frequencies are administered.

After the ten cycles, overall score generator apparatus 128 calculates the average baseline response for both the discrimination test and the cognitive test. For example, in a specific application, the average baseline discrimination level response of the subject can be 40 normalized units at a background noise level of 15 normalized units for the discrimination level test while the average baseline response be 0.5 sec for the cognitive test. From these baseline responses, overall score generator apparatus 128 prepares DL and CT LUTs, for example, the DL and CT LUTS shown in FIGS. 3a and 3b. Apparatus 100 is now ready for monitoring the alertness of the subject.

For the sake of exposition, the manner in which overall score generator apparatus 128 calculates two scores for a subject whose state of alertness is deteriorating is now described. Assuming that the subject's responses for the first alertness test were $DL_1=60$, $CT_1=0.7$ secs and $ERR=0$, then the overall performance score of the subject is calculated as follows. For his response in the discrimination test, according to the DL LUT, the subject receives a Suspect rating, while, in a similar manner, for his response in the cognitive test, the subject according to the CT LUT receives a Normal rating. Hence, on referring to Overall Score LUT, then the overall score of the subject for the first alertness test is "Suspect" and the time T of the next test is 3.5 minutes. The results and the time of the test are stored in memory 130.

Then, assuming that the subject's responses for the second alertness test were $DL_1=70$, $CT_1=0.95$ secs, $ERR=1$, respectively, then the overall performance score of the subject is calculated as follows. For his response in the discrimination test according to the DL LUT, the subject receives a Tired rating, while, in a similar manner, for his response in the cognitive test according to the CT LUT, the subject receives a Tired rating. Hence, on referring to Overall Score LUT, then the overall score of the subject for the second alertness test is "Tired" and the time of the next test is 2 minutes. The results and the time of the test are stored in memory 130.

Hence, it can be readily appreciated that due to the deterioration of the state of alertness of the subject from a Suspect rating to a Tired rating, control apparatus 106 preferably adjusts the period of time between tests from 3.5 minutes to 2 minutes, thereby placing the state of alertness of the subject under more intense scrutiny and therefore improving the state of alertness of the subject.

While the invention has been described with respect to a limited number of embodiments, it will be appreciated that many variations, modifications and other applications of the invention may be made.

What is claimed is:

1. Apparatus for monitoring and improving the alertness of a subject while the subject is performing a primary activity, the apparatus comprising:
   (a) first stimulation means for providing at least one discrimination level test stimulus of increasing intensity to the subject;
   (b) first response means operable by the subject for responding to said at least one discrimination level test stimulus;
   (c) second stimulation means for providing at least one cognitive test stimulus to a subject while the subject continues to perform the primary activity, said second stimulation means being responsive to an intensity level of said discrimination level test and to said first response means to set an intensity level of said cognitive test stimulus,
   (d) second response means operable by the subject for responding to said at least one cognitive test stimulus; and
   (e) control means for controlling the rate of activation of at least one of said stimulation means such that its rate of activation increases inversely with a deteriorating state of alertness of the subject so as to improve the alertness of the subject.

2. Apparatus as in claim 1, wherein each of said stimulation means includes one selected from the following group: a loudspeaker for providing an audible stimulus; a capsule speaker for providing an audible stimulus; a vibrator for providing a tactile stimulus; and a light emitting device for providing a visual stimulus.

3. Apparatus as in claim 1, wherein said first stimulation means includes said second stimulation means.

4. Apparatus as in claim 1, wherein said discrimination level test stimulus includes one selected from the following group: a signal of increasing intensity; a pair of signals of substantially the same intensity; a signal having a variable rate of increase in intensity; and a signal having a variable initial intensity.

5. Apparatus as in claim 1, wherein said cognitive test stimulus includes one selected from the following group: at least two signals of different frequencies; at least two signals of different intensities; at least three signals where the interval between two consecutive signals is different; and at least two signals of different pulse width.

6. Apparatus as in claim 1, wherein each of said stimulation means is fashioned as one selected from the following group: a hand-held portable device; a wristwatch; a behind-the-ear clip; a pair of spectacles; and an attachment on a steering wheel.

7. Apparatus as in claim 1, wherein each of said response means includes one selected from the following group: a pad and a microphone.

8. Apparatus as in claim 1, wherein said first response means includes said second response means.

9. Apparatus as in claim 1, wherein each of said response means is fashioned as one selected from the following group: a hand-held portable device; a wristwatch; and an attachment on a steering wheel.

* * * * *